US008009317B2

(12) United States Patent
Nagata

(10) Patent No.: US 8,009,317 B2
(45) Date of Patent: Aug. 30, 2011

(54) PRINTING METHOD AND APPARATUS FOR SETTING OVERRUNNING WIDTHS IN MARGINLESS PRINTING

(75) Inventor: Kouji Nagata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 10/241,535

(22) Filed: Sep. 12, 2002

(65) Prior Publication Data

US 2003/0053096 A1 Mar. 20, 2003

(30) Foreign Application Priority Data

Sep. 17, 2001 (JP) ................................ 2001-282400
Sep. 6, 2002 (JP) ................................ 2002-261986

(51) Int. Cl.
*G06K 15/00* (2006.01)

(52) U.S. Cl. ........ 358/1.18; 358/1.12; 358/1.9; 358/1.2; 358/3.27; 358/3.28; 400/279; 347/105; 347/106

(58) Field of Classification Search .................. 358/1.9, 358/1.18, 1.12, 1.13, 1.2, 3.27–3.28; 347/105–106; 382/298; 400/279
See application file for complete search history.

(56) References Cited

U.S. PATENT DOCUMENTS

| | | | | |
|---|---|---|---|---|
| 5,825,996 | A * | 10/1998 | Davis et al. | 358/1.18 |
| 6,109,745 | A | 8/2000 | Wen | |
| 6,239,817 | B1 * | 5/2001 | Meyer | 347/36 |
| 6,549,301 | B1 * | 4/2003 | Yasukawa | 358/1.2 |
| 6,744,527 | B1 | 6/2004 | Dorsey et al. | |
| 7,010,176 | B2 * | 3/2006 | Kusunoki | 382/299 |
| 7,011,389 | B2 * | 3/2006 | Edamura et al. | 347/36 |
| 7,224,482 | B2 | 5/2007 | Shima | |
| 7,483,166 | B2 * | 1/2009 | Kadoi et al. | 358/1.18 |
| 7,573,606 | B2 * | 8/2009 | Nomoto et al. | 358/1.9 |
| 2002/0036665 | A1 * | 3/2002 | Shima | 347/5 |
| 2002/0057281 | A1 * | 5/2002 | Moroo et al. | 345/668 |
| 2003/0053096 | A1 * | 3/2003 | Nagata | 358/1.9 |
| 2004/0012796 | A1 * | 1/2004 | Matsuyama | 358/1.2 |
| 2005/0271437 | A1 * | 12/2005 | Edamura et al. | 400/76 |
| 2006/0033943 | A1 * | 2/2006 | Yanagi | 358/1.13 |
| 2007/0024874 | A1 * | 2/2007 | Kawamura | 358/1.2 |

FOREIGN PATENT DOCUMENTS

| | | | | |
|---|---|---|---|---|
| DE | 199 47 419 | | | 4/2001 |
| EP | 1 186 993 | | | 3/2002 |
| JP | 07205529 | A | * | 8/1995 |
| JP | 07-245698 | | | 9/1995 |
| JP | 11-192761 | | | 7/1999 |
| JP | 11192761 | A | * | 7/1999 |
| JP | 11-338306 | | | 12/1999 |
| JP | 11338306 | A | * | 12/1999 |
| JP | 2001-026148 | | | 1/2001 |
| JP | 2001-75697 | | | 3/2001 |
| JP | 2002-91723 | | | 3/2002 |

* cited by examiner

*Primary Examiner* — Chan S Park
*Assistant Examiner* — Jacky X Zheng
(74) *Attorney, Agent, or Firm* — Fitzpatrick, Cella, Harper & Scinto

(57) ABSTRACT

The present invention prevents necessary image data from deviating from a print medium and thereby executes a good printing operation without a loss of necessary image data. For this purpose, when performing a so-called marginless printing, in which ink is applied also to an area overrunning from the print medium to form an image without leaving a blank margin at edges of the print medium, the overrunning widths of the area are made adjustable.

2 Claims, 16 Drawing Sheets

PRINTING METHOD AND APPARATUS FOR SETTING OVERRUNNING WIDTHS IN MARGINLESS PRINTING

This application is based on Japanese Patent Application Nos. 2001-282400 filed Sep. 17, 2001 and 2002-261986 filed Sep. 6, 2002, the contents of which are incorporated hereinto by reference.

BACKGROUND OF THE INVENTION

1. Field of the Invention

The present invention relates to a printing condition changing method for changing printing conditions that are used to perform a so-called marginless printing in which an area (colorant application area or print area) having a first area inside edges of a print medium and a second area outside the edges of the print medium is applied a colorant to form an image with at least one edge of the print medium removed of a blank margin. The present invention also relates to a program, a storage medium, a printing method, a printer and a printing system used in connection with the printing condition changing method.

2. Description of the Related Art

In conventional printing systems there is a method generally called a marginless printing which prints an image on a print medium without leaving a blank margin at edge (end) portions of the print medium.

Such a marginless printing may be performed by setting a size of an image print area (colorant application area) larger in terms of pixel number than that of the print medium (or paper) and printing an image to extend slightly beyond the edges of the print medium. When this marginless printing is executed, however, a distance that the printed image overruns the edges of the print medium is fixed to a value recommended for the printer capable of the marginless printing. For example, as shown in FIG. 9, an image is printed in a strip area E0 just outside the print medium P which extends outwardly from the four edges of the print medium P by fixed amounts LA, LB, LC and LD recommended for the printer.

When a marginless printing is done by printing an image so that the printed image extends beyond the upper, lower and side edges of the print medium P by fixed amounts LA, LB, LC and LD recommended for the printer, as shown in FIG. 9, certain portions at the upper, lower and side edge portions of the original image to be printed will naturally fail to be printed on the print medium P, i.e., a certain volume of image data is lost from the printed image on the medium. For example, when data D of an original image such as shown in FIG. 10A is marginless-printed on a print medium P, a certain volume of data D corresponding to fixed peripheral widths recommended for the printer is lost at the upper, lower and side edges of the print medium P, as shown in FIG. 10B. As a result, even those image data printed at the lower right corner in FIG. 10B which is necessary for the user may get lost.

In that case, the user has no alternative but to tolerate such a partial loss of image data because there is no means available for putting inside the area of the print medium P the lost image data corresponding to a peripheral print area surrounding the edges of the print medium.

SUMMARY OF THE INVENTION

An object of the present invention is to provide a printing condition changing method, a program, a storage medium, a printing method, a printer and a printing system which enable a satisfactory printing without a loss of necessary image data by preventing necessary image data from deviating from a print medium and from failing to be printed on the print medium.

In the first aspect of the present invention, there is provided a printing condition changing method for changing printing conditions that are used to print an image by applying a colorant to a first area on a print medium and a second area overrunning from the print medium, the method comprising the step of:

adjusting an overrunning width of the second area extending outwardly from the print medium.

In the second aspect of the present invention, there is provided a printing condition changing method for changing printing conditions that are used to print an image by applying a colorant to an area, the area including a first area on a print medium and a second area overrunning from the print medium, the method comprising the step of:

changing a size of the second area.

In the third aspect of the present invention, there is provided a printing condition changing method for changing printing conditions that are used to perform a marginless printing in which a colorant is applied to a first area inside edges of a print medium and a second area overrunning outwardly from the edges of the print medium to form an image with at least one edge of the print medium removed of a blank margin, the method comprising the step of:

adjusting an overrunning width of the second area extending outwardly from the print medium.

In the fourth aspect of the present invention, there is provided a printing condition changing method for changing printing conditions that are used to print an image by applying a colorant to a colorant application area, the colorant application area including a first area on a print medium and a second area overrunning from the print medium, the method comprising the step of:

changing a size of the colorant application area.

In the fifth aspect of the present invention, there is provided a printing condition changing method for changing printing conditions that are used to print an image by applying a colorant to a print area based on print data corresponding to the print area, the print area including a first area on a print medium and a second area overrunning from the print medium, the method comprising the steps of:

changing an overrunning width of the second area extending outwardly from the print medium; and changing a size of the print data based on the changed overrunning width.

In the sixth aspect of the present invention, there is provided a printing condition changing method for changing printing conditions that are used to print an image on a print medium by applying a colorant to an area, the area including a first area on the print medium and a second area overrunning from the print medium, the method comprising the step of:

adjusting a position of the first area in the area to which the colorant is applied.

In the seventh aspect of the present invention, there is provided a program for setting printing conditions that are used to print an image by applying a colorant to a first area on a print medium and a second area overrunning from the print medium, the program having a computer execute the step of:

adjusting an overrunning width of the second area extending outwardly from the print medium.

In the eighth aspect of the present invention, there is provided a program for changing printing conditions that are used to print an image by applying a colorant to an area, the area including a first area on a print medium and a second area overrunning from the print medium, the program having a computer execute the step of:

changing a size of the second area.

In the ninth aspect of the present invention, there is provided a program for setting printing conditions that are used to perform a marginless printing in which a colorant is applied to a first area inside edges of a print medium and a second area overrunning outwardly from the edges of the print medium to form an image with at least one edge of the print medium removed of a blank margin, the program having a computer execute the step of:

adjusting an overrunning width of the second area extending outwardly from the print medium.

In the tenth aspect of the present invention, there is provided a program for changing printing conditions that are used to print an image by applying a colorant to a colorant application area, the colorant application area including a first area on a print medium and a second area overrunning from the print medium, the program having a computer execute the step of:

changing a size of the colorant application area.

In the eleventh aspect of the present invention, there is provided a program for setting printing conditions that are used to print an image by applying a colorant to a print area based on print data corresponding to the print area, the print area including a first area on a print medium and a second area overrunning from the print medium, the program having a computer execute the steps of:

changing an overrunning width of the second area extending outwardly from the print medium; and changing a size of the print data based on the changed overrunning width.

In the twelfth aspect of the present invention, there is provided a printing method for printing an image by applying a colorant to a first area on a print medium and a second area overrunning from the print medium, the printing method comprising the step of:

adjusting an overrunning width of the second area extending outwardly from the print medium before printing the image.

In the thirteenth aspect of the present invention, there is provided a printing method for printing an image by applying a colorant to an area, the area including a first area on a print medium and a second area overrunning from the print medium, the method comprising the step of:

changing a size of the second area before printing the image.

In the fourteenth aspect of the present invention, there is provided a printing method for performing a marginless printing in which a colorant is applied to a first area inside edges of a print medium and a second area overrunning outwardly from the edges of the print medium to form an image with at least one edge of the print medium removed of a blank margin, the method comprising the step of:

adjusting an overrunning width of the second area extending outwardly from the print medium before printing the image.

In the fifteenth aspect of the present invention, there is provided a printing method for printing an image by applying a colorant to a colorant application area, the colorant application area including a first area on a print medium and a second area overrunning from the print medium, the method comprising the step of:

changing a size of the colorant application area before printing the image.

In the sixteenth aspect of the present invention, there is provided a printing method for printing an image by applying a colorant to a print area based on print data corresponding to the print area, the print area including a first area on a print medium and a second area overrunning from the print medium, the method comprising the steps of:

changing an overrunning width of the second area extending outwardly from the print medium;

changing a size of the print data based on the changed overrunning width; and applying the colorant to the print area based on the size-changed print data.

In the seventeenth aspect of the present invention, there is provided a printing system comprising:

a printer capable of performing a marginless printing in which a colorant is applied to a first area inside edges of a print medium and a second area overrunning outwardly from the edges of the print medium to form an image with at least one edge of the print medium removed of a blank margin; and a controller capable of adjusting an overrunning width of the second area extending outwardly from the print medium.

With the above construction, when performing a so-called marginless printing which prints an image without leaving a blank margin at edges of the print medium, the overrunning widths of a print area extending from the edges of the print medium can be set arbitrarily by the user.

In this specification, the "marginless printing" means a printing operation that prints an image with at least one edge of a print surface of the print medium removed of a blank margin. For example, when a print medium is quadrangular, the marginless printing includes cases where a blank margin is eliminated from all four sides of the print medium, where it is eliminated from three of the four sides but is provided at the remaining one side, where it is eliminated from two of the four sides but is provided at the remaining two sides, and where it is eliminated from one of the four sides but is provided at the remaining three sides.

Further, in this invention, the marginless printing is performed by applying a colorant (e.g., ink) to an area that includes an area in the print medium (an area inside the edges of the print medium) and an area overrunning from the print medium (an area overrunning outwardly from the edges of the print medium). In this case, to be more precise, the area overrunning from the print medium is only applied with the colorant but not printed with an image. However, if the action of applying the colorant is taken as a printing operation, it can be said that the printing operation is performed also on the overrunning area. Thus, in this specification, for the sake of simple explanation, an area including the area on the print medium (first area) and the area overrunning from the print medium (second area) is referred to as a "print area." When viewed from a different angle, since the area including the first area and the second area is also an area to which the colorant is applied, it is also called a "colorant application area."

With this invention, when performing a so-called marginless printing in which a colorant is applied to an area (colorant application area or print area) including the area on the print medium and the area overrunning from the print medium to form an image with at least one edge of the print medium removed of a blank margin, the overrunning width of the area overrunning from the print medium can be adjusted to select, according to user preferences, a range of image to be printed on the print medium and a range of image that deviates from the print medium and is not printed.

As a result, it is possible to prevent necessary image data from deviating from the print medium and failing to be printed, and to execute a good printing operation without a loss of necessary image data.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, one embodiment of the present invention will be described by referring to the accompanying drawings.

Figure 1:
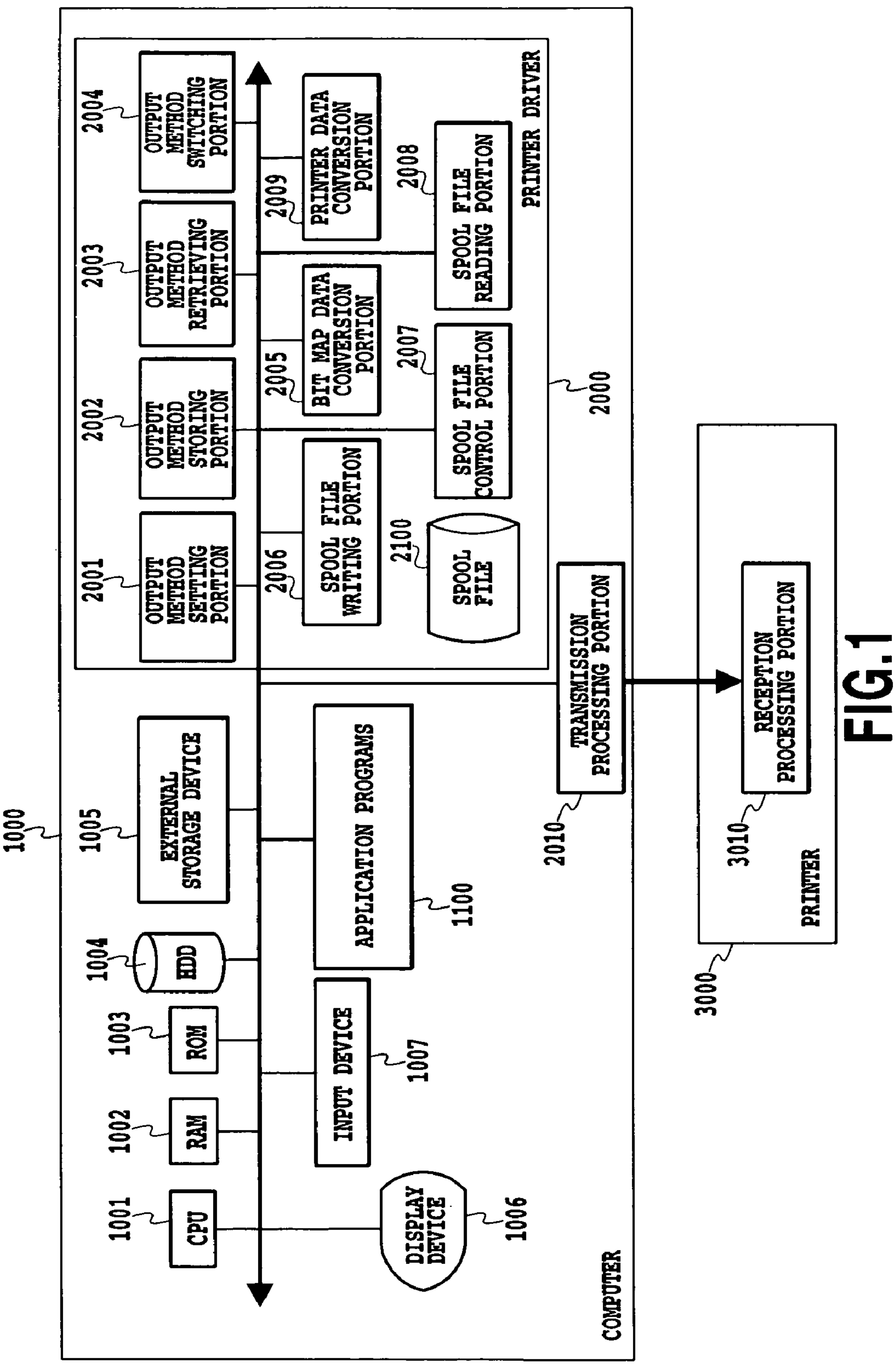
FIG. 1 is a block diagram showing a configuration of a printing system according to one embodiment of the present invention.

FIG. 1 is a block diagram showing a print system as one embodiment of the invention. The system of FIG. 1 comprises largely a computer 1000 and a printer 3000.

The computer 1000 has a known configuration comprising a CPU 1001, a RAM 1002, a ROM 1003, a hard disk drive (HDD) 1004, a display unit 1006, and an input device 1007 such as keyboard and mouse. It also includes an external storage device 1005. The external storage device 1005 reads and writes data and programs to and from removable media (for example, DVD-ROMs, CD-ROMs, PDs, MOs, FDs, JAZZ (registered trademark), JIP (registered trademark), various magnetic tapes, etc.). The RAM 1002 is used as a work area for the CPU 1001 and for temporarily storing data.

The computer 1000 loads a variety of application programs 1100 and a printer driver 2000 including a program of this invention from the external storage device 1005 into the hard disk drive (HDD) 1004 or RAM 1002 and executes them by the CPU 1001. The printer driver, when executed, can exhibit a characteristic output processing function described later. In FIG. 1, the printer driver 2000 and a spool file 2100 generated by the printer driver 2000 are shown separate from storage media such as hard disk drive (HDD) 1004 and RAM 1002 for convenience of explanation. In addition to the storage media such as hard disk drive (HDD) 1004 and RAM 1002, the printer driver 2000 can also be loaded into a variety of read/write storage mediums for execution. Further, the printer driver 2000 may also be stored in a nonvolatile memory such as ROM and NVRAM or loaded into a remote storage device by communicating with the device through a network. Print data generated by the printer driver 2000 is transmitted by a transmission processing portion 2010 to a reception processing portion 3010 in the printer 3000.

Figure 2:
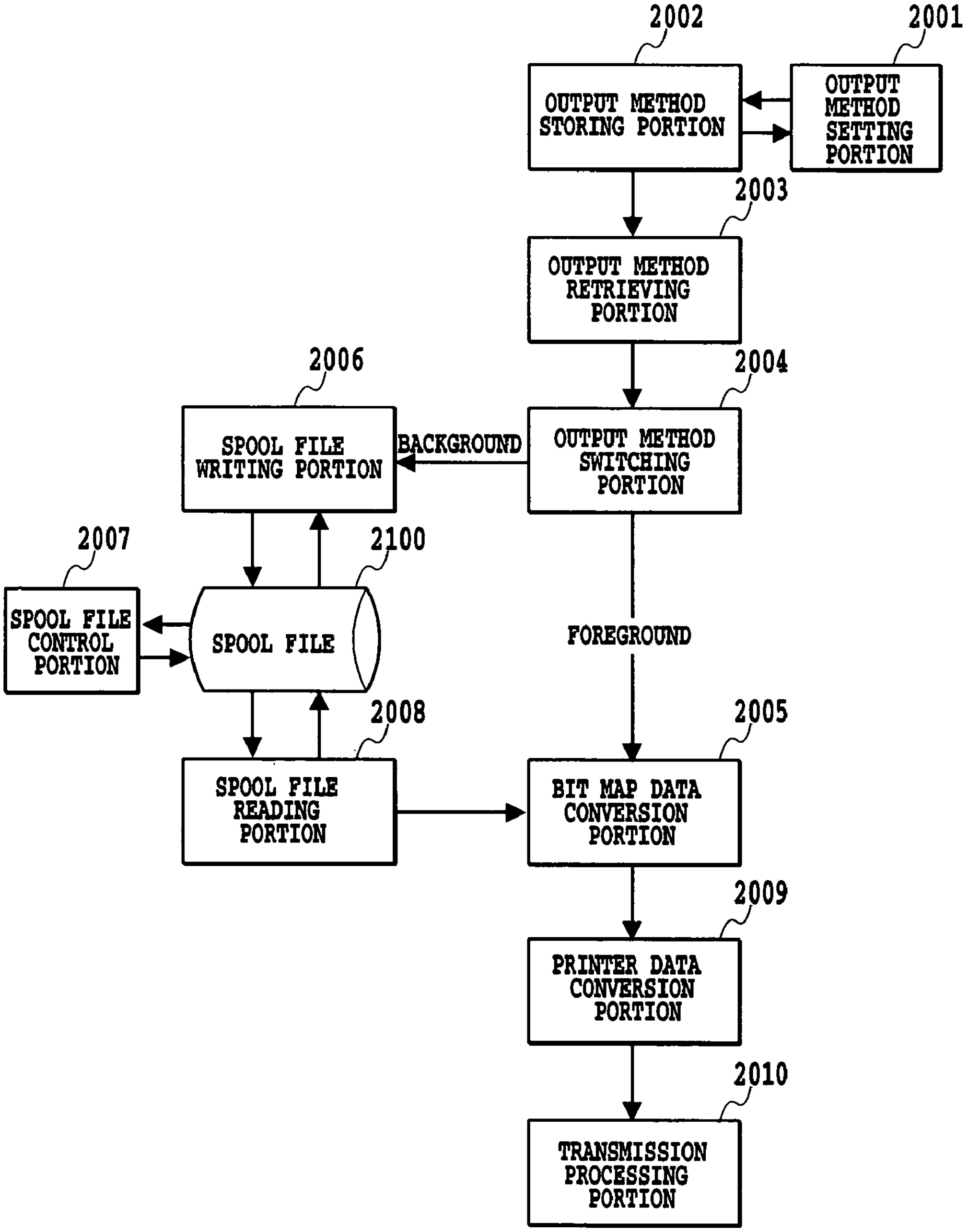
FIG. 2 is a block diagram showing a relation among constitutional elements of a printer driver in FIG. 1.

The printer driver 2000 includes the following elements 2001-2100. These elements 2001-2100 are related with each other as shown in FIG. 2.

Reference numeral 2001 represents an output method setting portion that allows the user to change a content of setting of a print data output method. The user interface incorporating the program of this invention is also included in this portion. Designated 2002 is an output method storing portion to store the content of setting of the print data output method set by the output method setting portion 2001. Denoted 2003 is an output method retrieving portion to retrieve the content of setting of the print data output method stored in the output method storing portion 2002. Designated 2004 is an output method switching portion to switch the output processing between foreground and background according to the content of setting of the output method retrieved by the output method retrieving portion 2003. The foreground means processing with a high priority (foreground task processing) and the background means processing with a low priority (background task processing). A spool file writing portion 2006 stores the print data in the spool file 2100 when the output method switching portion 2004 switches the output processing to background. A spool file control portion 2007 controls the order in which the print data stored in the spool file 2100 by the spool file writing portion 2006 is output and displayed and specifies a storage destination of the spool file 2100. A spool file reading portion 2008 reads the print data from the spool file 2100.

A bit map data conversion portion 2005 converts print data into bit map data according to the content of setting of the output method retrieved by the output method retrieving portion 2003. A printer data conversion portion 2009 converts the bit map data, which was produced by the bit map data conversion portion 2005, into a desired data format, or printer data, suited for printing by the printer 3000. Denoted 2010 is a transmission processing portion that sends the printer data produced by the printer data conversion portion 2009 to the printer 3000.

Next, a series of functions of the printer driver 2000 will be explained in detail.

First, the output method setting portion 2001 sets the print data output method on the computer 1000. The output method setting portion 2001 uses a user interface screen (display page on the display device 1006) set up on GUI (graphic user interface) for the user to set the print data output method from the input device 1007.

Figure 4:
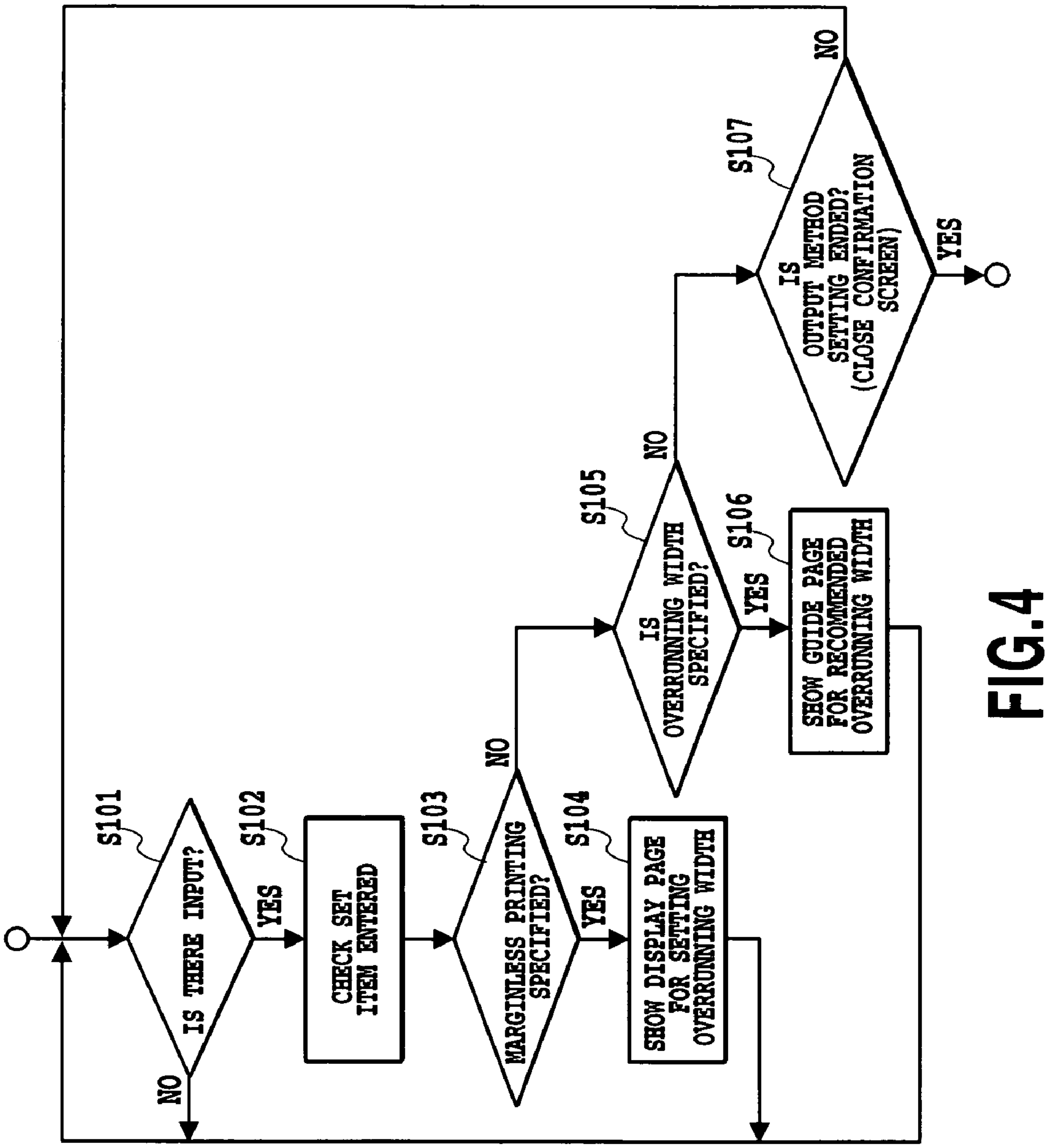
FIG. 4 is a flow chart showing an operation performed by an output processing method setting unit in FIG. 2.

FIG. 4 is a flow chart showing a procedure for setting the output method by the output method setting portion 2001.

Figure 3A:
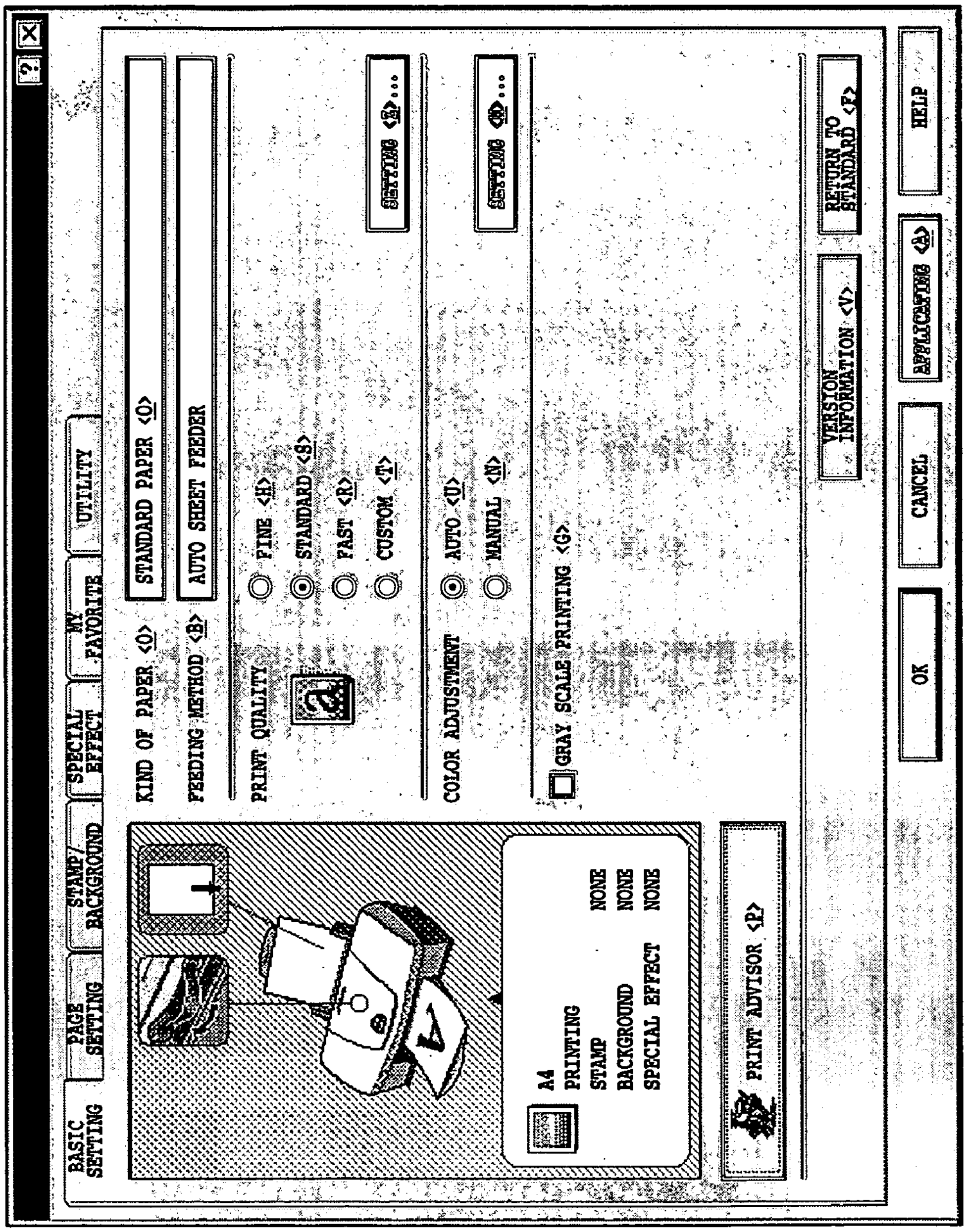
FIG. 3A, FIG. 3B and FIG. 3C are explanatory views showing different display pages of a user interface in the computer of FIG. 1.
Figure 8A:
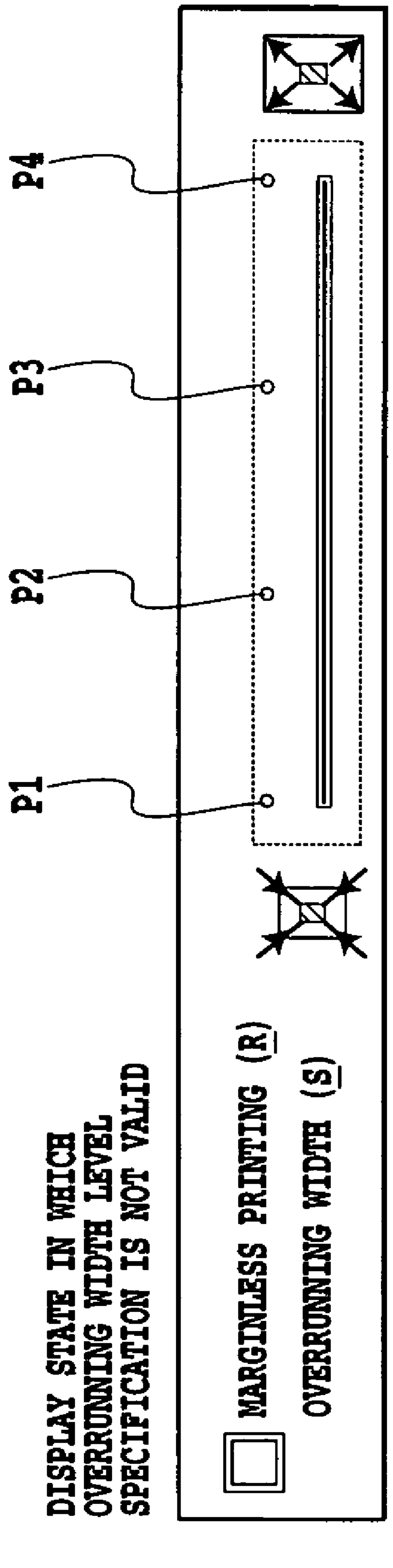
FIG. 8A, FIG. 8B and FIG. 8C are explanatory views showing different display pages of a user interface in the computer of FIG. 1.
Figure 8B:
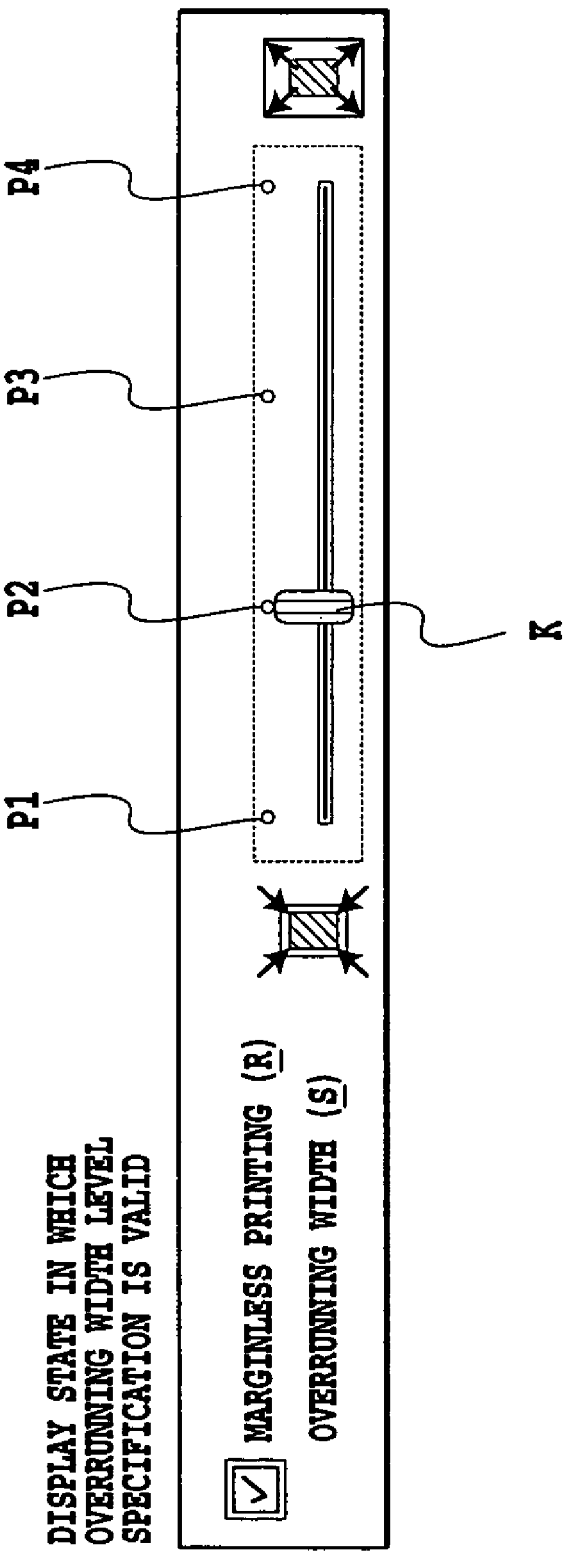

First, a check is made to see if there is an input from the user for setting the output method (step S101). The user input is entered from an input means such as the input device 1007 using the user interface screen (display page on the display device 1006) built by the GUI, as shown in FIG. 3A. The user input may be made by using a variety of input devices such as mouse, tablet and screen touch. When there is no input from the user, the output method setting portion 2001 waits for it. When an input from the user is found, a set item for the entered output method is checked (step S102). The content of setting entered from the user is stored in the output method storing portion 2002, as described earlier. Next, it is checked whether the set item specifies a marginless printing, a printing method in which a print area including an area on the print medium (paper) and an area overrunning outwardly from the edges of the print medium is applied a colorant to form an image without leaving a blank margin at edge portions of the print medium (step S103). When the set item specifies the marginless printing, the display content on the display device 1006 is changed to a display page for specifying the overrunning width (step S104), after which the output method setting portion 2001 waits for a user input that specifies the overrunning width. In this example, a user interface screen of FIG. 8B generated by the GUI is displayed as a display page for specifying (or "adjusting" or "changing") the overrunning width. The overrunning width is specified (or adjusted or changed) by the user selecting an overrunning width specification item with a mouse pointer and dragging a knob or handle K on the screen to left or right. A more detailed explanation on the specifying method will be given later. When the marginless printing is not specified, a user interface screen as shown in FIG. 8A is displayed. On the screen of FIG. 8A, the knob K is not displayed and thus the overrunning width cannot be specified (or adjusted or modified).

In the decision of step S103, when the set item is found not specifying the marginless printing, it is then checked whether the set item specifies the overrunning width (step S105). When the set item is found to specify the overrunning width, a guide page for an overrunning width recommended for the printer is displayed (step S106) and the output method setting portion 2001 waits for an input from the user that specifies the overrunning width. In this example, on the display page of FIG. 8B, selecting an overrunning width specification item by clicking on it with a mouse pointer C causes the screen of FIG. 8B to change to a user interface screen of FIG. 8C built by the GUI as a guide for setting the overrunning width recommended for the printer.

Figure 8C:
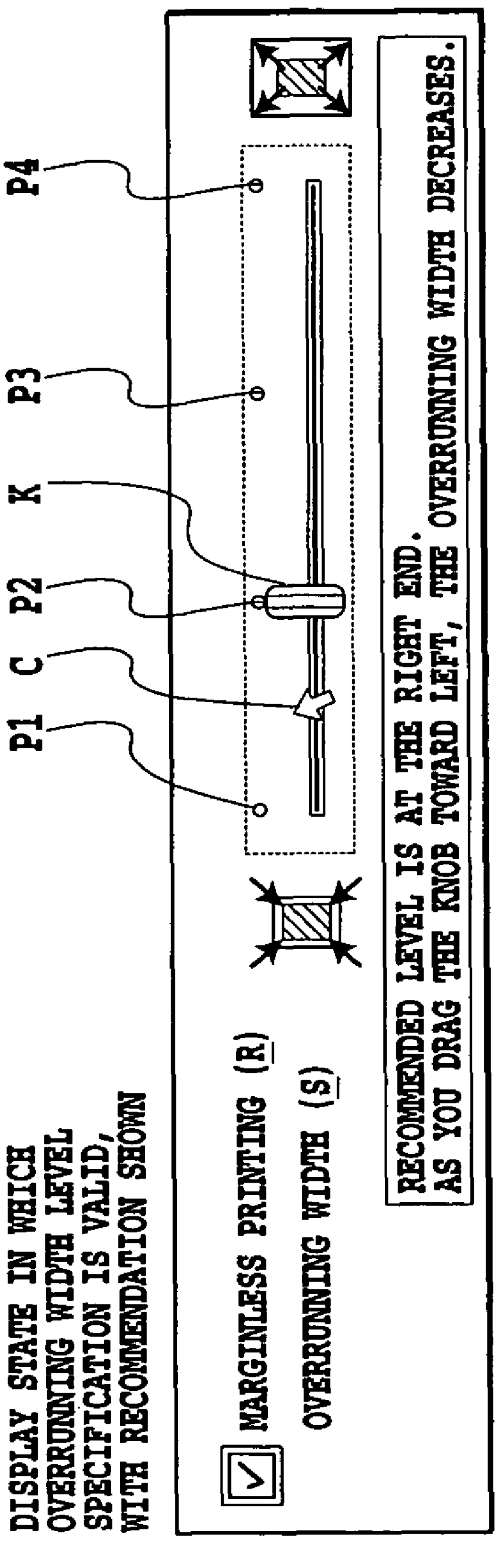
Figure 9:
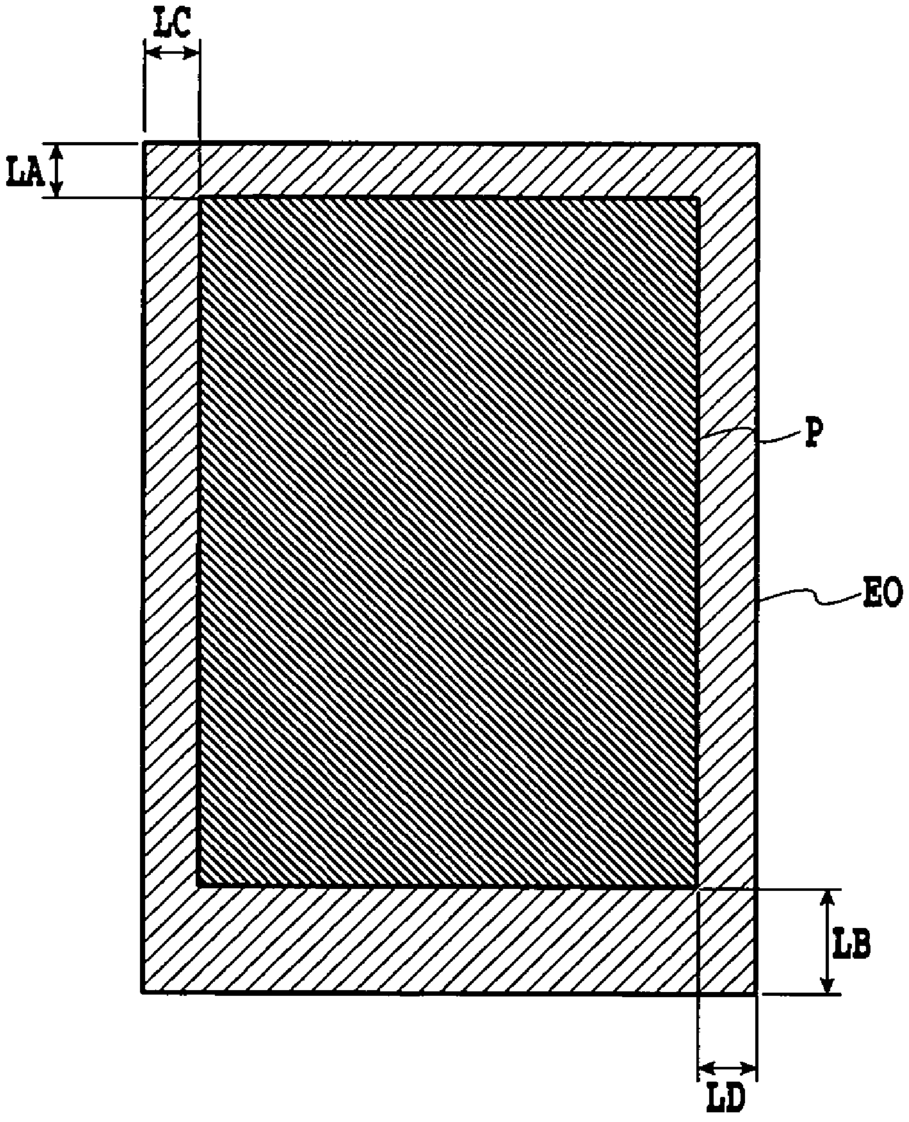
FIG. 9 is an explanatory view showing fixed overrunning widths in a conventional example.

In the screen of FIG. 8C, a message concerning the recommended overrunning width is displayed, which reads "recommended width is at the right end; as you drag the knob to left, the overrunning width becomes smaller." Then, the knob K on the screen of FIG. 8C is dragged by mouse pointer to one of four positions P1, P2, P3, P4, thus selectively specifying one of four levels (first to fourth level) of the overrunning width corresponding to the position of the knob K. These four levels of overrunning width will be detailed later. In this embodiment as described above, two or more levels of overrunning width are made available for selection, thus allowing an adjustment (change) of the overrunning width.

In step S105, when the set item is found not specifying the overrunning width, a further check is made to determine whether the process of setting the output method should be ended or not (step 107). If it is determined that the output method setting process should not be terminated, the setting portion waits for an input from the user. If it is decided that the output method setting process should be ended, the screen for setting the output method is closed and this module processing of FIG. 4 is exited.

With the processing of FIG. 4 executed as described above, the output method setting portion 2001 changes the display page according to the set item for the output method entered by the user.

After the setting of the output method is completed, when the printing is to be executed, the content of setting of the output method is stored in the output method storing portion 2002 (see FIG. 2). Then, the content of setting of the output method stored in the output method storing portion 2002 is retrieved by the output method retrieving portion 2003. Based on the content of setting of the output method thus retrieved, the output method switching portion 2004 switches the print output processing between foreground and background, as described earlier.

The print output processing will be explained by dividing it into "foreground" processing with a high priority and "background" processing with a low priority.

"Foreground"

When the print output processing is to be done in the foreground, the bit map data conversion portion 2005 converts the print data into bit map data. The conversion procedure by the bit map data conversion portion 2005 will be explained by referring to flow charts of FIG. 5 and FIG. 6.

First, a check is made to confirm whether the content of setting of the output method retrieved by the output method retrieving portion 2003 specifies a marginless printing (step S201). If the marginless printing is found specified, information on print data resolution is changed according to the procedure of the flow chart shown in FIG. 6 (step S202).

In the resolution information change processing in FIG. 6, with overrunning widths (LA, LB, LC, LD) recommended for the printer taken as references, overrunning widths (La, Lb, Lc, Ld) from the top, bottom and side edges of the print medium P are calculated from a formula (1) given below according to the levels of overrunning width (level 1 to level 4) specified by the user (step S301). These overrunning widths (La, Lb, Lc, Ld) are hereinafter referred to also as "specified overrunning widths."

$$\text{Specified overrunning width} = (\text{recommended overrunning width}) \times (\text{specified level}) \div (\text{number of levels}) \tag{1}$$

Figure 7:
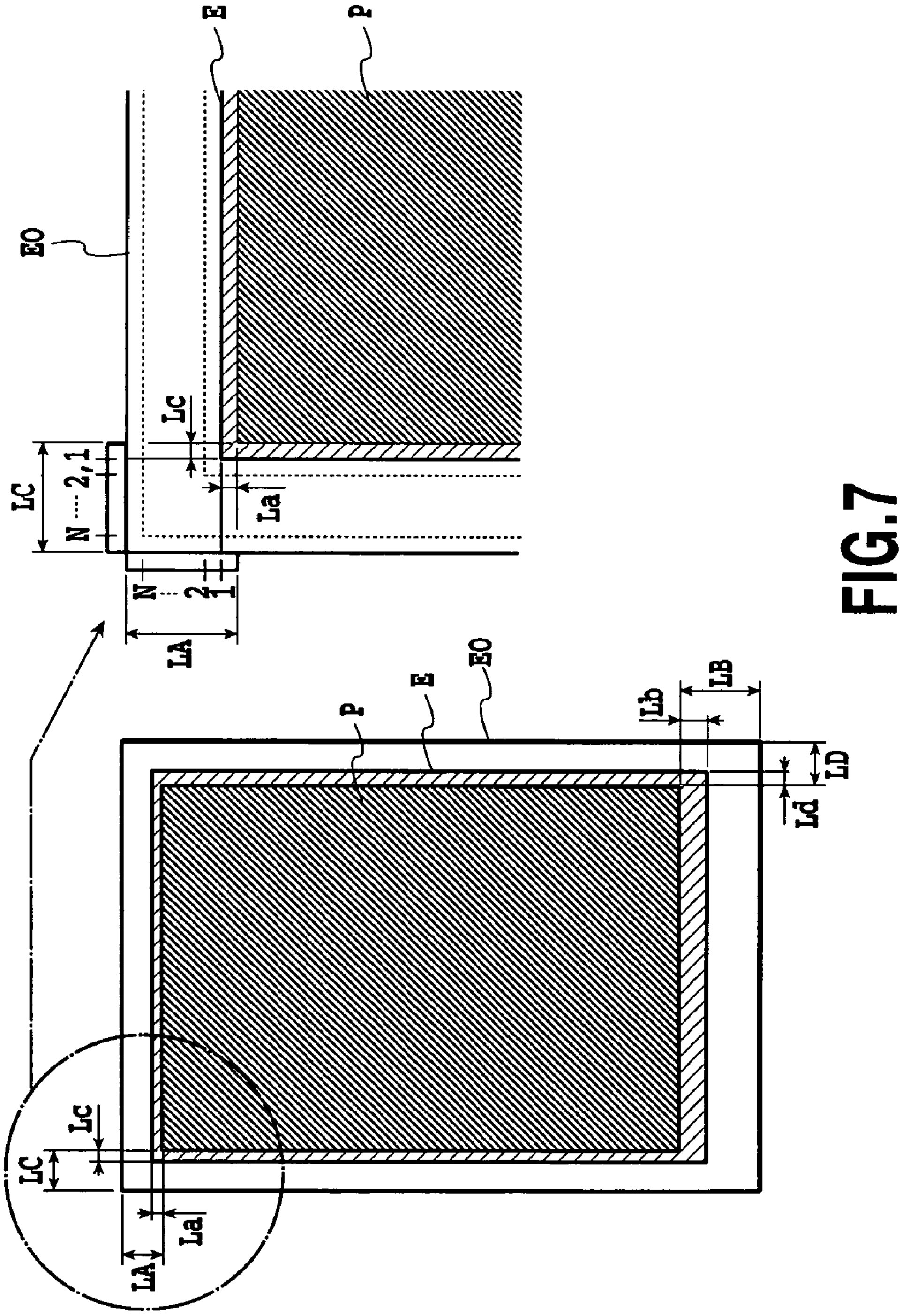
FIG. 7 is an explanatory schematic view showing a method of adjusting overrunning widths in the printing system of FIG. 1.

The printer-recommended overrunning widths LA, LB, LC, LD are fixed overrunning widths at top, bottom and side edges of the print medium, as shown in FIG. 7. If a marginless printing is performed by using these overrunning widths LA, LB, LC, LD, an image is formed by applying a colorant (for example, ink) to an area E0 which includes a first area of the print medium and a second area extending overrunning distances (LA, LB, LC, LD) outwardly from the edges of the print medium P. The number of levels of overrunning width is the number of divisions N by which each of the printer-recommended overrunning widths LA, LB, LC, LD is equidistantly divided. The specified level is a magnitude of overrunning width (1 to N) specified by the user from among the magnitudes or levels of overrunning width. For example, when the user wishes to print an image on an area E which extends beyond four sides (top, bottom and side edges) of the print medium P as shown in FIG. 7, specified overrunning widths La, Lb, Lc, Ld are set to level "1".

In this example, the number of levels is four and, in the screen of FIG. 8C, the knob K is slid selectively to one of four positions P1, P2, P3, P4 to specify one of four levels (level 1, level 2, level 3 and level 4). In this way, the amounts by which the image print area overruns from the edges of the print medium can be adjusted (changed). When the overrunning width is set to "0" by aligning the image print area E to the edges of the print medium P, the level 1 is specified. When an image to be printed is expanded vertically and horizontally by equal magnifications to increase the distances by which the image print area E overruns from the top, bottom and side edges of the print medium, the second, third and fourth level are specified successively in that order.

Then, using the top and bottom overrunning widths La, Lb, a magnification of the printed image in a vertical direction (lengthwise direction of paper) is calculated from a formula (2) given below (step S302).

$$\text{Vertical magnification}=\{(\text{length of paper})+(La+Lb)\}\div(\text{length of paper}) \quad (2)$$

Next, using the left and right overrunning widths Lc, Ld, a magnification of the printed image in a horizontal direction (widthwise direction of paper) is calculated from a formula (3) given below (step S303).

$$\text{Horizontal magnification}=\{(\text{width of paper})+(Lc+Ld)\}\div(\text{width of paper}) \quad (3)$$

Next, it is checked whether the vertical magnification is equal to or greater than the horizontal magnification (step S304). If the vertical magnification is equal to or greater than the horizontal magnification, the vertical magnification is used to change the resolution from a formula (4) given below (step S305). If on the other hand the vertical magnification is smaller than the horizontal magnification, the horizontal magnification is used to change the resolution from the following formula (5) given below (step S306). The modified resolution is also referred to as "theoretical resolution."

$$\text{Theoretical resolution}=(\text{resolution})\times(\text{vertical magnification}) \quad (4)$$

$$\text{Theoretical resolution}=(\text{resolution})\times(\text{horizontal magnification}) \quad (5)$$

Next, the theoretical resolution determined from equation (4) or (5) is set as a print data resolution (step S307). With the resolution modified in this manner, the image print area is also changed in units of pixels.

Figure 5:
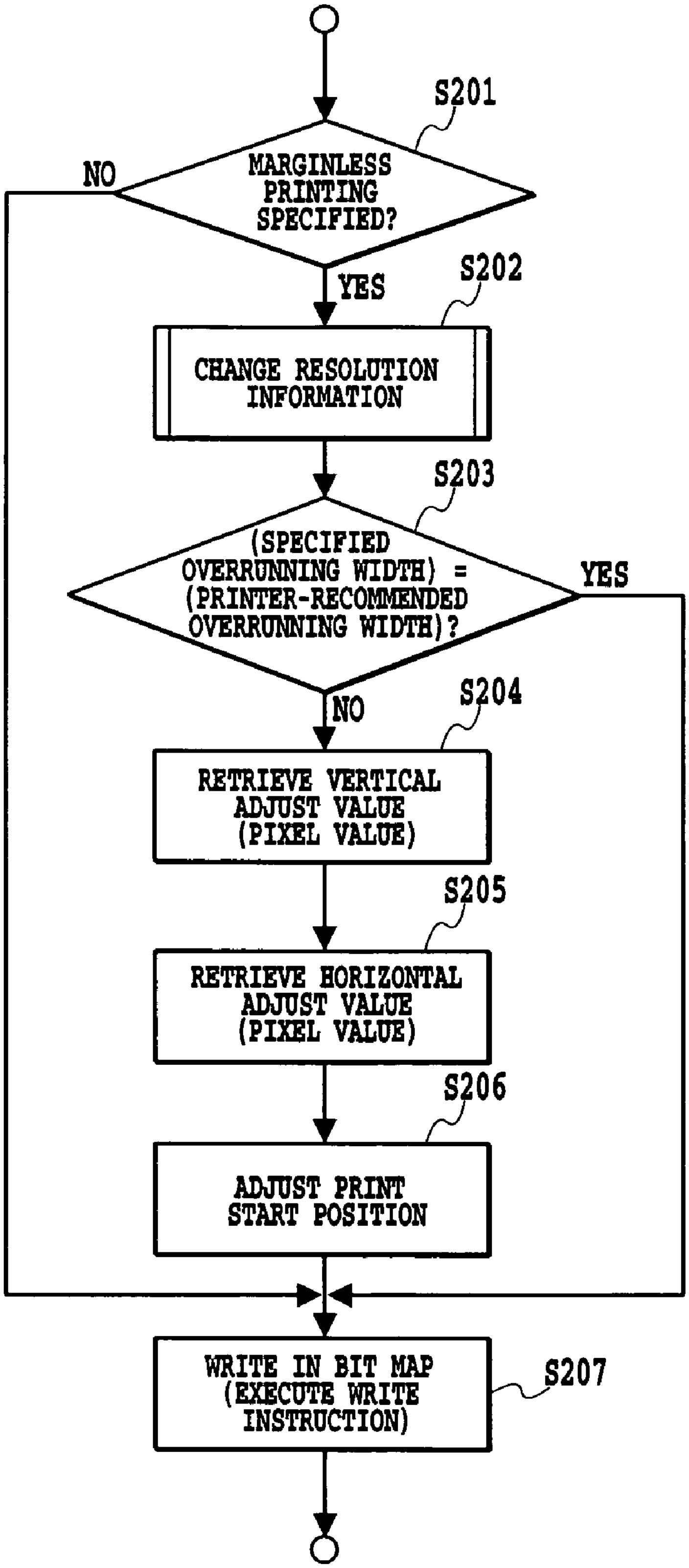
FIG. 5 is a flow chart showing an operation performed by a bit map data conversion unit in FIG. 2.
Figure 6:
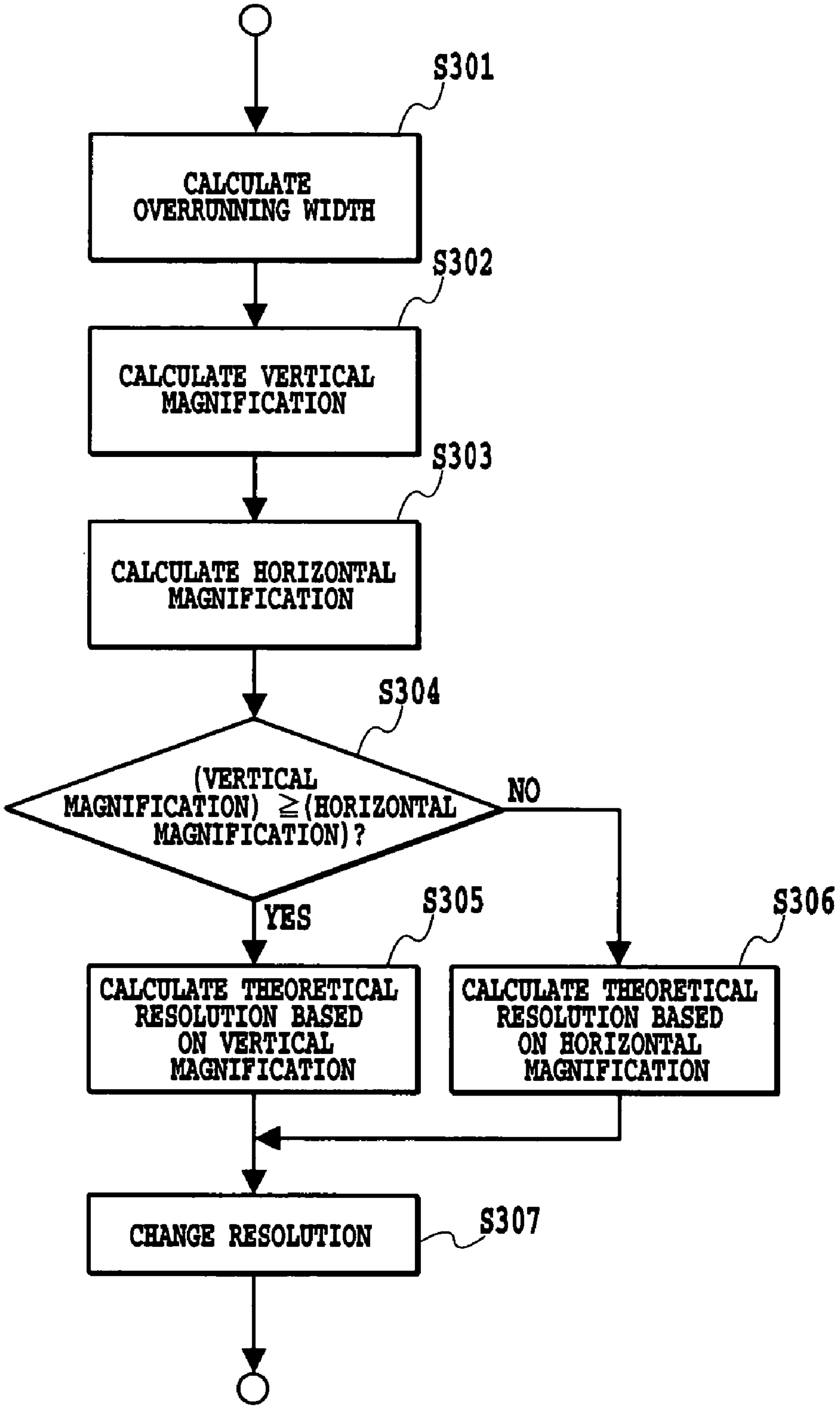
FIG. 6 is a flow chart showing a process of changing resolution information in FIG. 5.

After the resolution information change processing detailed in FIG. 6 has been executed in step S202 of FIG. 5, a check is made in step S203 to determine if the specified overrunning widths (La, Lb, Lc, Ld) agree with the printer-recommended overrunning widths (LA, LB, LC, LD). When the specified overrunning widths (La, Lb, Lc, Ld) do not agree with the printer-recommended overrunning widths (LA, LB, LC, LD), vertical and horizontal adjust pixel values for adjusting a print start position are calculated (step S204, step S205). The vertical adjust pixel value is calculated from an equation (6) below using the printer-recommended top overrunning width (LA), the resolution characteristic of printer (printer resolution), and the above-described specified level and number of levels. The horizontal adjust pixel value is calculated from an equation (7) below using the printer-recommended left overrunning width (LC), the resolution characteristic of printer (printer resolution), and the above-described specified level and number of levels.

$$\text{Vertical adjust pixel value}=(LA)\times(\text{printer resolution})\times(\text{specified level})\div(\text{number of levels}) \quad (6)$$

$$\text{Horizontal adjust pixel value}=(LC)\times(\text{printer resolution})\times(\text{specified level})\div(\text{number of levels}) \quad (7)$$

Based on the vertical and horizontal adjust pixel values, the printing start position (writing start position) at an upper left corner of the image print area E in FIG. 7 is set as an origin of a coordinate system (step S206). After this, the bit map data conversion portion 2005 (see FIG. 2) writes the print data in a bit map (i.e., converts the print data into bit map data) according to such write instructions (step S207). The bit map data generated by the bit map data conversion portion 2005 is converted by the printer data conversion portion 2009 (see FIG. 2) into printer data in a desired format suited for printing by the printer 3000. Then, the transmission processing portion 2010 sends the printer data generated by the printer data conversion portion 2009 to the printer 3000.

"Background"

When the output method switching portion 2004 (see FIG. 2) switches the print output processing to the background, the spool file writing portion 2006 stores the print data in the spool file 2100 on a storage medium in a special file format. Before writing the print data into the spool file 2100, the spool file writing portion 2006 performs processing similar to steps S301-S306 of FIG. 6 to change the resolution information on the print data when a marginless printing is specified.

Figure 3B:
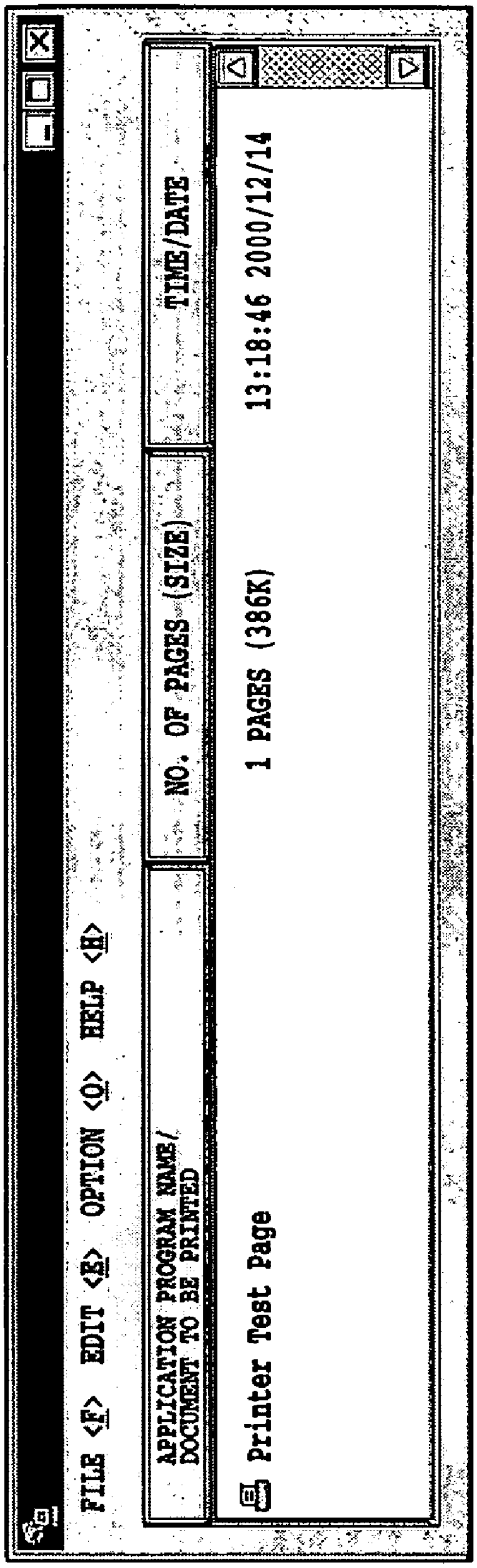

At the same time that the print data begins to be stored in the spool file 2100, the spool file writing portion 2006 starts the spool file control portion 2007. The spool file control portion 2007 executes processing, such as displaying the output order of spool file 2100 and specifying the destination, according to a program for controlling the spool file 2100 and then displays a user interface screen (display page on the display device 1006) generated by the GUI, as shown in FIG. 3B. The spool file control portion 2007 can also be started independently of the spool file writing portion 2006. In that case, too, the destination in which the print data is to be stored can be specified.

Figure 3C:
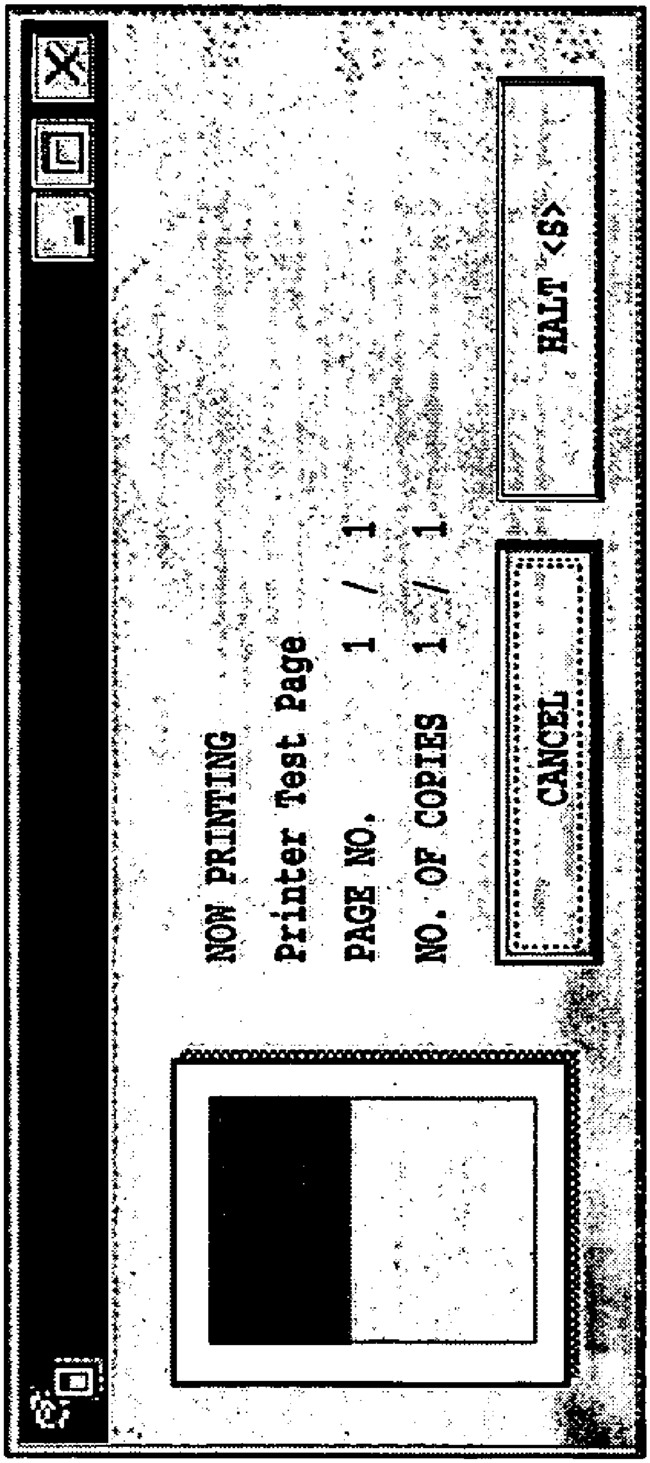

The spool file reading portion 2008 reads the print data from the spool file 2100. The spool file reading portion 2008 displays a reading status on a user interface screen (display page on the display device 1006) generated by the GUI, as shown in FIG. 3C.

The print data read by the spool file reading portion 2008 is processed by the bit map data conversion portion 2005 in a manner similar to the above-described steps S201-S206 and converted into bit map data. The bit map data generated by the bit map data conversion portion 2005 is converted by the printer data conversion portion 2009 into printer data in a format suited for printing by the printer 3000. The transmission processing portion 2010 transmits the printer data generated by the printer data conversion portion 2009 to the printer 3000.

"Example Configuration of Printer"

Figure 11:
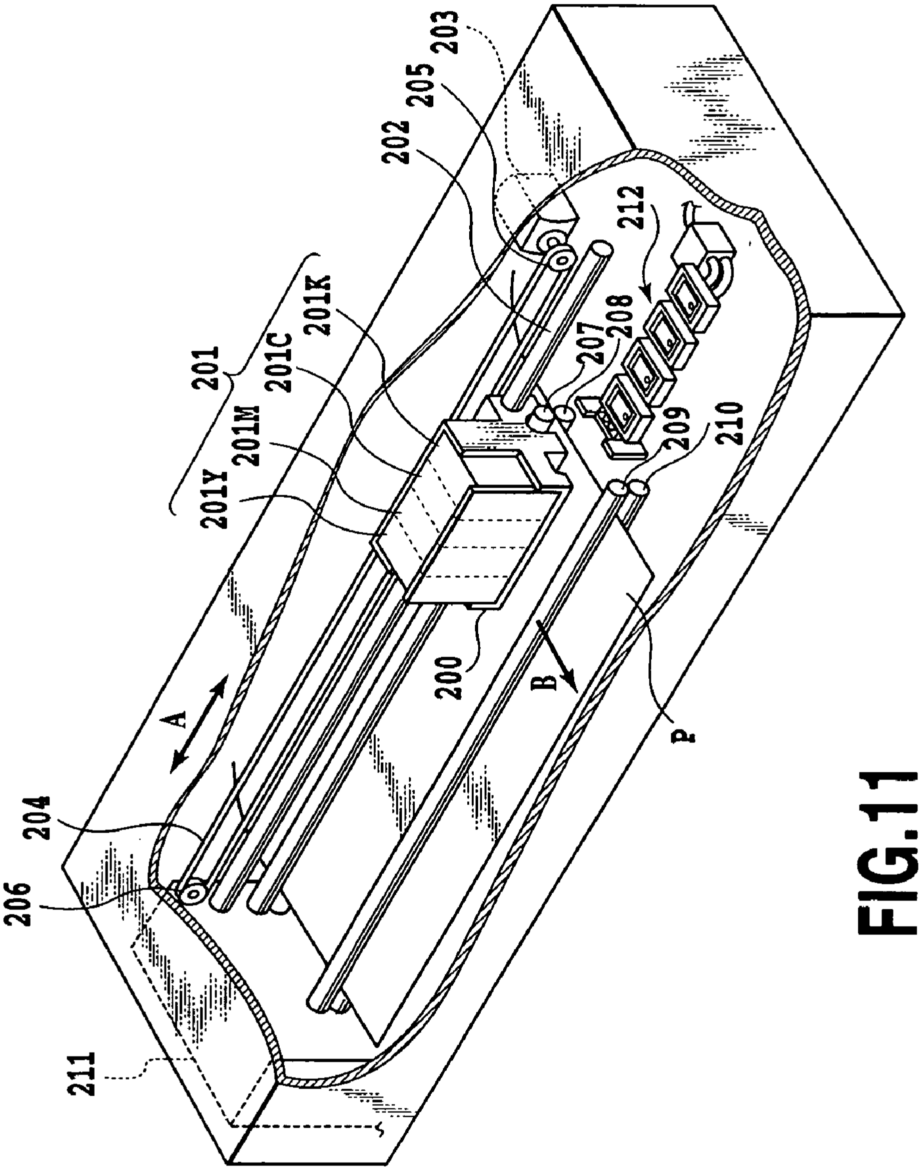
FIG. 11 is a perspective view showing essential parts In an example construction of a printer that can apply the present invention.
Figure 12:
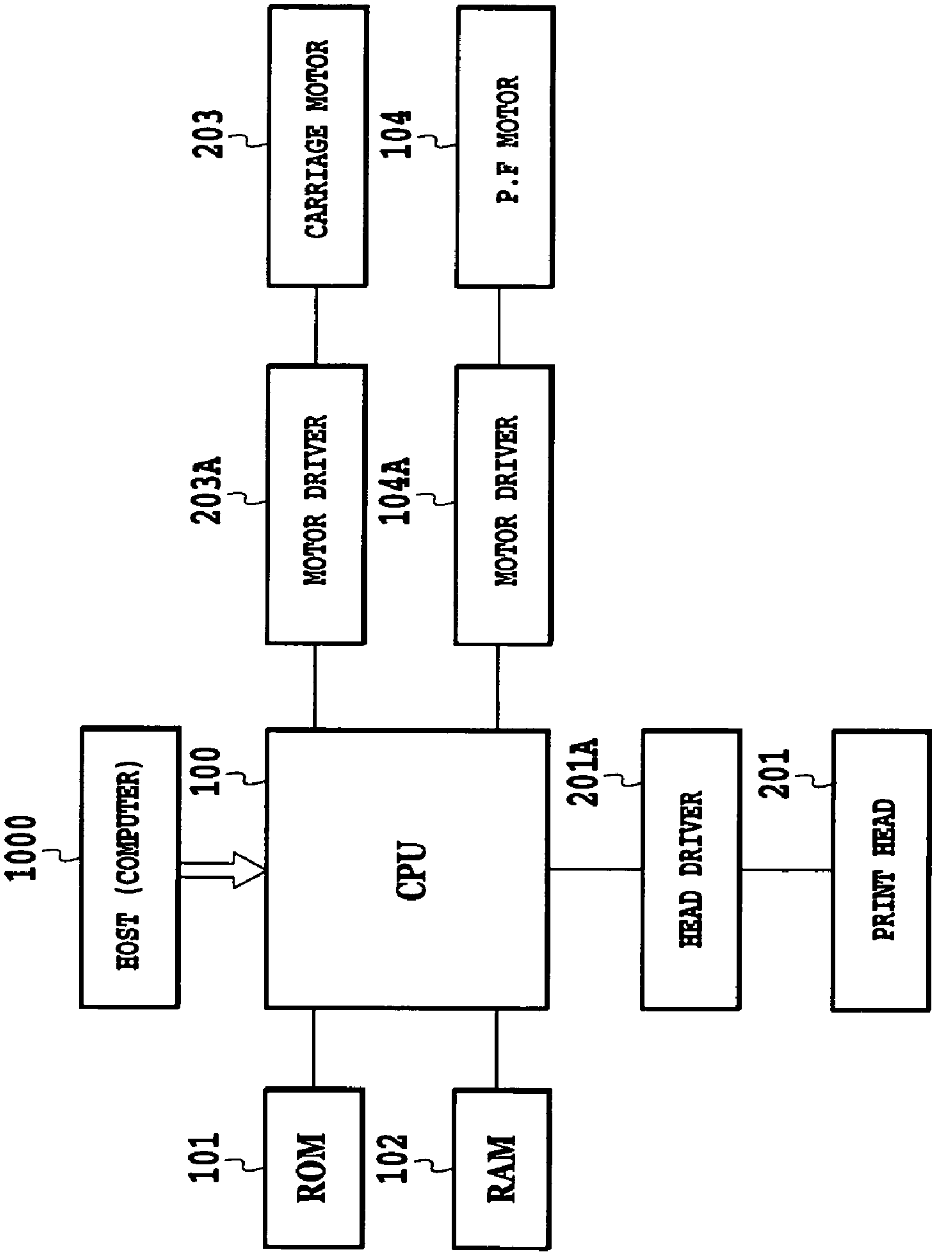
FIG. 12 is a block diagram of a control system in the printer of FIG. 11.

FIG. 11 is a perspective view showing an example construction of a printer capable of marginless printing. FIG. 12 is a block diagram showing a configuration of a control system for the printer.

The printer of this example is a serial scan type printing apparatus in which a carriage 200 is guided on a guide shaft 202 so that it can be moved in a main scan direction indicated by an arrow A. The carriage 200 is secured to a belt 204 which is stretched between the pulleys 205, 206. The carriage 200 is reciprocally moved in the main scan direction by the belt 204 as the pulley 205 that drives the belt 204 is rotated by a carriage motor 203 forwardly or backwardly. The carriage 200 mounts a print head 201. The print head 201 in this example is an ink jet print head capable of ejecting ink. The print head mounted on the carriage 200 may include a print head 201K for ejecting a black ink, a print head 201C for ejecting a cyan ink, a print head 201M for ejecting a magenta ink and a print head 201Y for ejecting a yellow ink to form a color image. The print head 201 may use a thermal energy generated by electrothermal transducers for ejecting ink. In that case, heat produced by the electrothermal transducer causes a film boiling in the ink whose bubble forming energy ejects an ink droplet from an ink ejection opening or nozzle.

The print medium or paper P is fed intermittently in a sub-scan direction, indicated by an arrow B, crossing the main scan direction. That is, the print medium P, while being held between an upstream pair of rollers 207, 208 and a downstream pair of rollers 209, 210, is fed under the print head 201 in the sub-scan direction. The upstream rollers 207, 208 and downstream rollers 209, 210 are driven by a drive portion 211. They may also be driven by the carriage motor 203.

In the printer of this example, a printing operation, which ejects ink onto the print medium P from the print head 201 as the print head 201 as well as the carriage 200 is are moved in the main scan direction, and a feeding operation, which feeds the print medium P a predetermined distance in the sub-scan direction, are repetitively alternated to form an image progressively on the print medium P. During a marginless printing, ink ejected at positions outside the print medium P (i.e., at overrunning positions) is absorbed by an ink absorbing member (not shown).

The carriage 200 is moved to a home position, as required, at the start of, or during, a printing operation. At the home position there is a cap member 212 that can cap an ink ejection opening forming surface of the print head 201. The cap member 212 is connected to a suction pump that can introduce a negative pressure into the interior of the cap. The cap member 212 hermetically enclosing the ink ejection openings of the print head 201 is supplied a negative pressure from the suction pump to suction out ink from the ink ejection openings to maintain a good ink ejection performance of the print head 201. This is called a recovery operation by suction. Further, the good ink ejection performance of the print head 201 is also maintained by ejecting ink, which does not contribute to image forming, from the ink ejection openings toward the inside of the cap member 212. This is called a recovery operation by ejection.

In FIG. 12 showing a schematic block configuration of a printer control system, a CPU 100 executes a control on the printer operation and data processing or the like. A ROM 101 stores a program representing a sequence of these processings or the like, and a RAM 102 is used as a work area for the CPU to execute these processings. Ink ejection from the print head 201 is performed by the CPU 100 supplying to a head driver 201A electrothermal transducer drive data (image data) and a drive control signal (heat pulse signal). The CPU 100 controls the carriage motor 203 for driving the carriage 200 in the main scan direction through a motor driver 203A and also controls a PF motor 104 for feeding the print medium P in the sub-scan direction through a motor driver 104A.

Other Embodiments

Figure 10A:
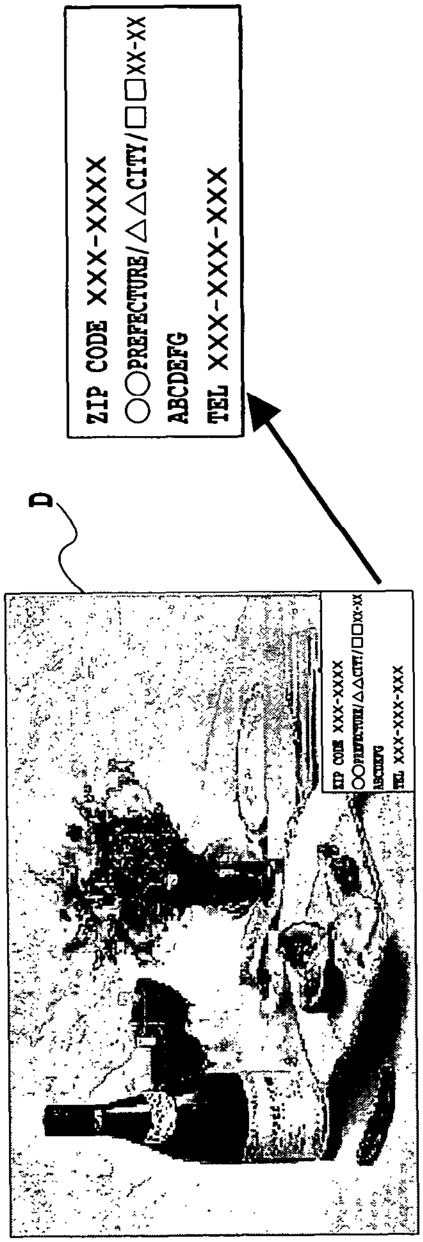
FIG. 10A is a front view of an original image to be printed, used for the explanation of the conventional example.
Figure 10B:
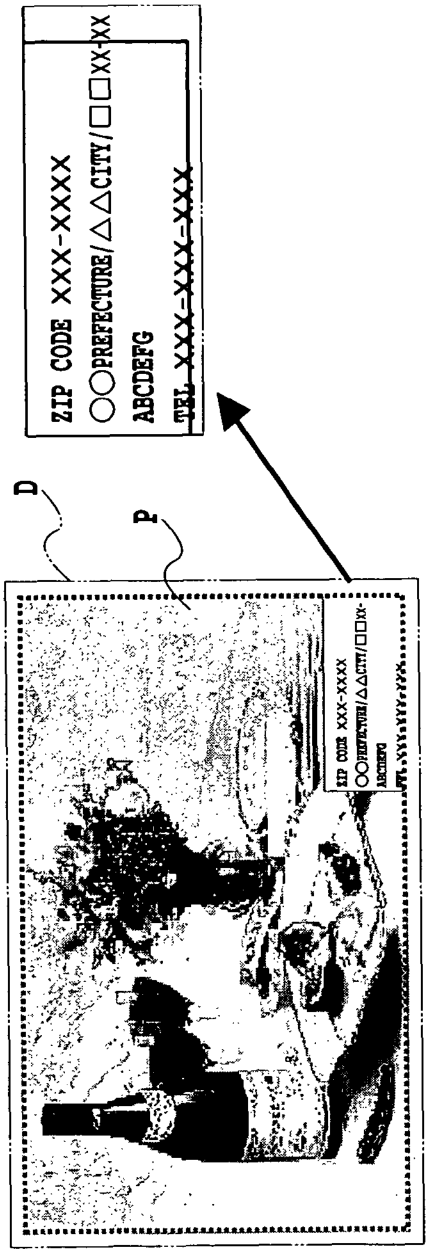
FIG. 10B is a front view of a printed image used for the explanation of the conventional example.

The adjustment of the overrunning width may be done continuously rather than stepwise as in the above embodiment. The overrunning width adjustment method is not limited to the above-described method, in which one overrunning width level is selected from among a plurality of levels (level 1 to level 4) and an image magnification is changed according to the selected overrunning width level, thus adjusting the overrunning widths from a print medium in the vertical and horizontal directions. For example, an image print area may be shifted vertically or horizontally with respect to the print medium without changing the image magnification to adjust the overrunning widths so as to keep required image data inside the print medium. When necessary image data lies outside an edge of the print medium, as shown at lower right in FIG. 10B, the image print area may be shifted toward upper left in the figure so that the necessary image data can be printed on the print medium. When the amount of shift of the image print area exceeds an allowable range, there is a possibility that a blank margin where no image is printed may be formed at edge portions of the print medium, failing to realize the marginless printing. In that case, the image magnification needs to be increased to increase the allowable range of shift of the image print area.

Further, it is possible to display an adjustment state of the overrunning widths on a screen so that the user can check it. In that case, as shown in FIG. 7, an image of a print area E which changes in size and position according to the adjustment of the overrunning widths and an outline image of the print medium P may be displayed overlapping each other.

In addition to an ink jet printing system using an ink jet print head, various other printing systems may be used for the printer. That is, this invention can also be applied to where an image is printed with coloring materials other than ink. Further, the ink ejection system in an ink jet print head is not limited to the one using the electrothermal transducers. For example, it may use such elements as piezoelectric elements.

The present invention has been described in detail with respect to preferred embodiments, and it will now be apparent from the foregoing to those skilled in the art that changes and modifications may be made without departing from the invention in its broader aspects, and it is the intention, therefore, that the appended claims to cover all such changes and modifications as fall within the true spirit of the invention.

What is claimed is:

1. An apparatus for setting a printing condition for performing a marginless print mode for printing an image without providing a margin on an edge of a print medium based on print data whose size is larger than that of the print medium, the apparatus comprising:

a setting unit that variably sets a level of overrunning widths of printing area of the print data overrunning outwardly from the print medium, the level of overrunning widths being selected from a plurality of different levels of overrunning widths available for each particular size of print medium set in a particular printing section, each level of overrunning widths including a different set of widths corresponding to plural edges of the print medium, and one level of overrunning widths for each particular size of print medium being a recommended set of overrunning widths;

a calculating unit that calculates magnification of the image based on dimensions of the print medium and the level of overrunning widths set by the setting unit;

a changing unit that changes a resolution of the print data based on the magnification calculated by the calculating unit and an original resolution of the print data; and an adjusting unit that adjusts a print start position on the print medium based on the resolution changed by the changing unit, the level of overrunning widths set by the setting unit, and the recommended set of overrunning widths.

2. A method for setting a printing condition for performing a marginless print mode for printing an image without providing a margin on an edge of a print medium based on print data whose size is larger than that of the print medium, the method comprising the steps of:

setting a level of overrunning widths of printing area of the print data overrunning outwardly from the print medium, the level of overrunning widths being selected from a plurality of different levels of overrunning widths available for each particular size of print medium set in a particular printing section, each level of overrunning widths including a different set of widths corresponding to plural edges of the print medium, and one level of overrunning widths for each particular size of print medium being a recommended set of overrunning widths;

calculating magnification of the image based on dimensions of the print medium and the level of overrunning widths set in the setting step;

changing a resolution of the print data based on the magnification calculated in the calculating step and an original resolution of the print data; and adjusting a print start position on the print medium based on the resolution changed in the changing step, the level of overrunning widths set in the setting step, and the recommended set of overrunning widths.

* * * * *